United States Patent [19]
Osterman

[11] Patent Number: 6,148,852
[45] Date of Patent: Nov. 21, 2000

[54] SUMP PIT REGULATING VALVE

[76] Inventor: David M. Osterman, 14213 Aldwych Dr., Orland Park, Ill. 60462

[21] Appl. No.: 08/976,762

[22] Filed: Nov. 24, 1997

[51] Int. Cl.$^7$ ............................ F16K 31/24; F16K 31/04; F16K 33/00
[52] U.S. Cl. .................... 137/391; 137/409; 137/448; 137/565.16; 251/294; 417/40; 417/44.1
[58] Field of Search .................... 137/391, 409, 137/423, 448, 440, 451, 565.01, 565.03, 565.16; 251/294; 417/36, 40, 26, 44.1

[56] References Cited

U.S. PATENT DOCUMENTS

| | | | |
|---|---|---|---|
| 922,142 | 5/1909 | Hogg | 137/448 |
| 1,020,615 | 3/1912 | Magnuson | 282/252 |
| 1,303,098 | 5/1919 | Merz | 285/252 |
| 1,811,952 | 6/1931 | Merritt | 417/40 |
| 1,960,659 | 5/1934 | Burks | 137/448 |
| 2,206,363 | 7/1940 | Murphy | 137/448 |
| 2,292,509 | 8/1942 | Carson | 137/448 |
| 2,354,693 | 8/1944 | Martin | 137/448 |
| 2,401,254 | 5/1946 | Lannert | 417/40 |
| 2,739,662 | 3/1956 | Sofia | 417/40 |
| 2,958,549 | 11/1960 | Spafford | 282/252 |
| 3,120,240 | 2/1964 | Kreuter | 137/448 |
| 3,303,669 | 2/1967 | Oetker | 285/252 |
| 3,619,084 | 11/1971 | Gordon | 417/40 |
| 4,621,945 | 11/1986 | Schaefer et al. | 137/451 |
| 4,640,307 | 2/1987 | Roberts | 137/448 |
| 4,678,001 | 7/1987 | Lacey | 137/448 |
| 4,909,274 | 3/1990 | Rodriguez | 417/40 |
| 5,020,567 | 6/1991 | Proulx | 137/451 |
| 5,430,252 | 7/1995 | Petersen | 285/252 |

*Primary Examiner*—George L. Walton
*Attorney, Agent, or Firm*—Vedder, Price, Kaufman & Kammholz

[57] ABSTRACT

A valve assembly that is composed of simple parts is described that is used to provide a sump pit water control device that operates due to the level of water within the sump and not by electricity. This valve assembly includes an adapter in the form of a tee-pipe that is capped at one end and attached at the other end to a drain tile pipe entering the sump. The third and remaining end of the tee-pipe is open but has a valve disposed therein that is operable between two positions. A float member is attached to the valve member by way of a cable so that as the water level rises in the sump, the valve member is drawn closed, and when the water level is at a normal or low level, the valve member is biased into an open position by a spring.

12 Claims, 2 Drawing Sheets

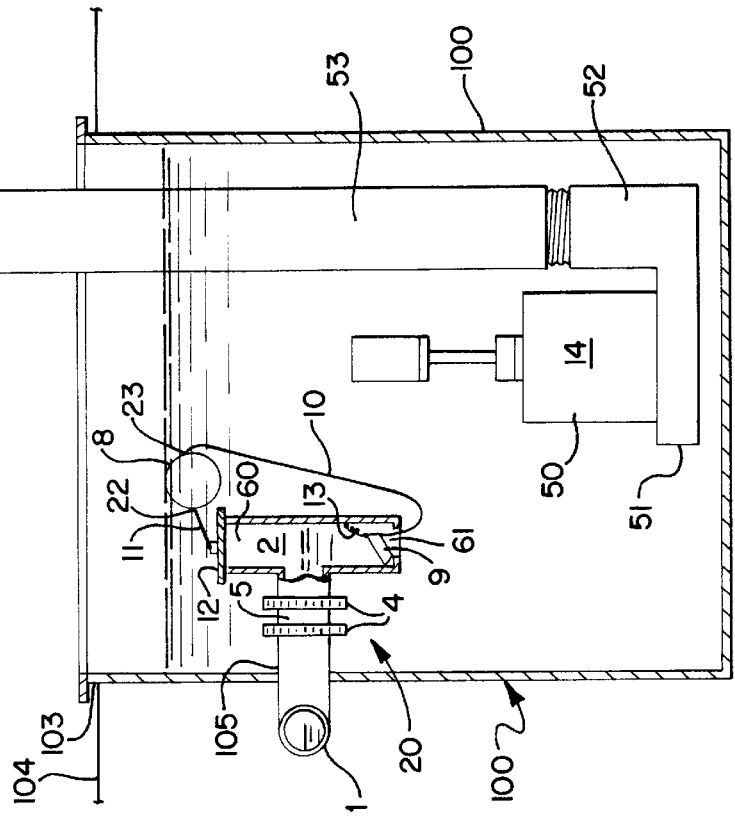
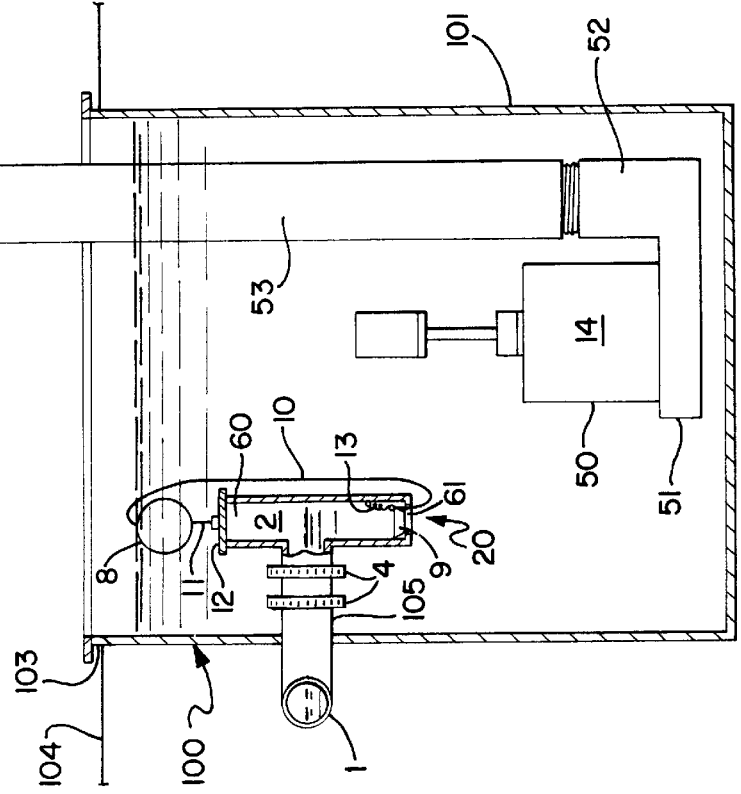

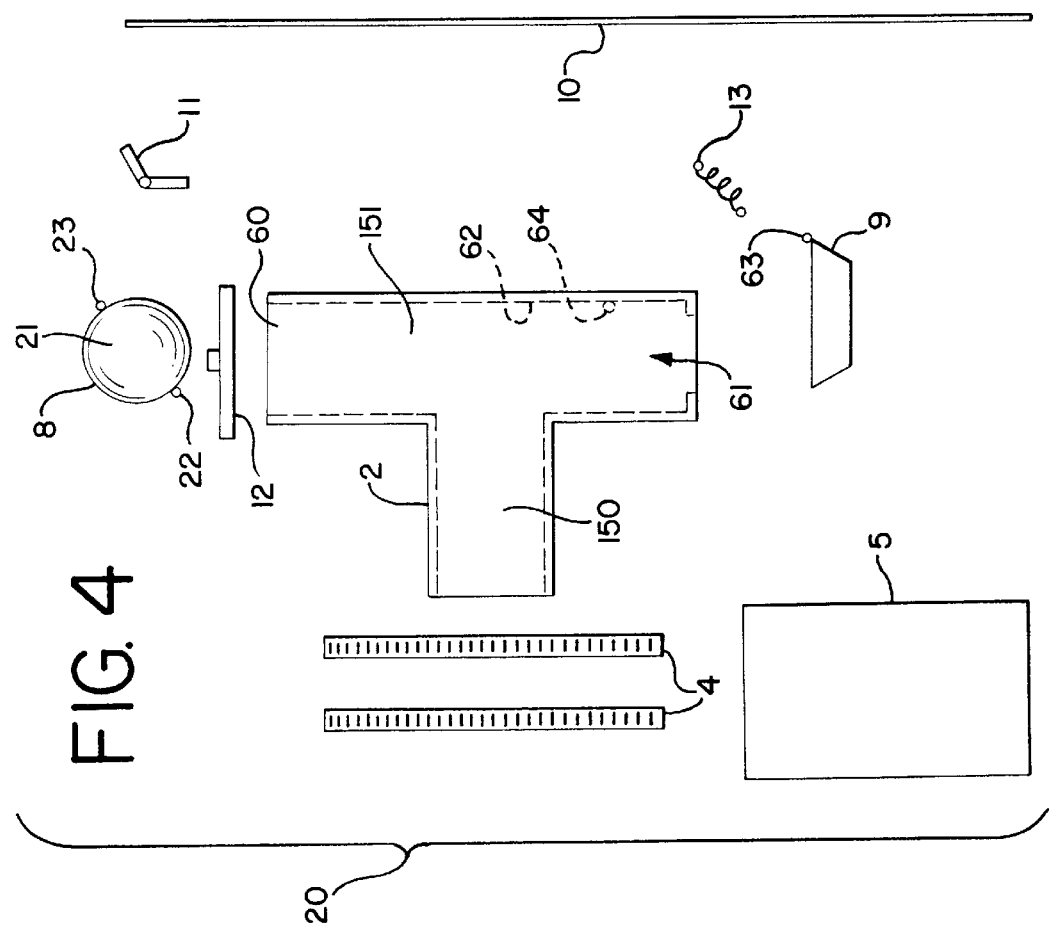
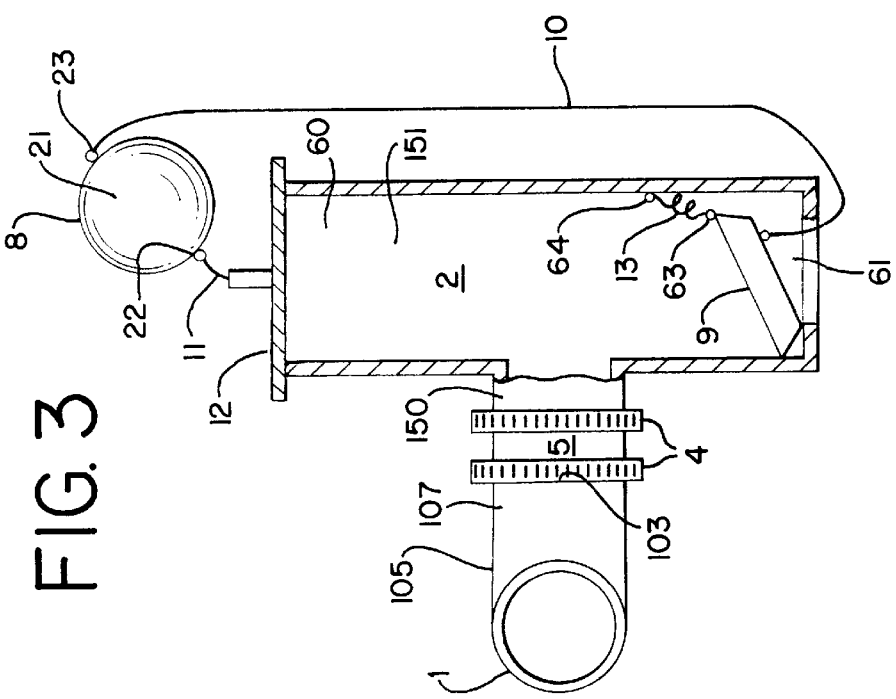

SUMP PIT REGULATING VALVE

BACKGROUND OF THE INVENTION

The present invention relates generally to the control of water entering sump pits, and more particularly to a valve for controlling the flow of groundwater from drain tiles into a basement sump pit Prior art valves, or devices, which controlled the flow of groundwater into basement sump pits from drain tiles located around the basement and leading into a basement sump pit, have always required electricity to control the device and thereby have controlled the water entering the basement sump.

Sump pits are devices that are inserted into sumps located in basements and are electrically driven. They cycle on and off to operate the sump pump, and the sump pump acts to eject the water out through a pipe to which it is connected. When the electricity controlling such a sump pump goes out, the homeowner is at peril of having his or her basement flooded, because the sump is at a low elevation compared to its associated drain tile, so that groundwater from rainwater will continue to flow into the sump. Only the pump can eject it from the sump.

One solution to this problem is for the homeowner to have a battery-powered "backup" sump. Although these are effective, they require that the battery be charged and capable of powering the sump pump for an extended time. The homeowner may forget to charge the battery, and in the midst of a heavy rainstorm, may not get the battery of the backup pump charged in time to prevent flooding of his basement. Additionally, the battery may become drained over time, and not contain a sufficient charge in order to power the sump pump.

It is therefore apparent that a need exists for a sump pump device that prevents overflow of basement sumps, that is not powered by electricity.

SUMMARY OF THE INVENTION

It is therefore a object of the present invention to provide a simple mechanism for regulating the amount of water that enters a basement sump that is not electrically operated.

Another object of the present invention is to provide a valve apparatus for regulating the amount of water that enters a basement sump which device utilizes a float that floats on the water in the basement sump and wherein the float is connected to a valve disposed within the drain tile opening of the sump such that the level of the water controls the position of the valve which is operable between either an open or a closed position.

Still a further object of the present invention is to provide a valve assembly for regulating the amount of water that enters into a basement sump, the operation of the assembly not being electrically operated and entirely mechanically operated, the assembly including a valve member disposed within a sump pipe extension member and in opposition to an opening thereof, the valve member being attached to a float member in a manner such that the movement of the float member controls the position of the valve member within the pipe extension.

These objects are accomplished primarily through the structure of the valve assembly. As present in the preferred embodiment of the invention, a sump pipe extension member is provided for connection to the stub end of a sump pipe that penetrates into and opens into a basement sump. This pipe extension is connected to the sump pipe and includes at least one opening that communicates with the sump. A valve member, such as a hinged flapper valve member, is disposed proximate to the sump pipe extension opening and is operable between an open and closed position. Water entering the extension pipe will force the valve shut and maintain it shut due to hydrostatic pressure.

In order to maintain the valve member in an appropriate position, a float member is provided that floats in the water in the basement sump. This float member is connected, at one end, to the valve member, and at another end to extension pipe. In this manner, a rising water level, will make the float rise within the sump and the float will exert a pressure on the valve member to close it against the incoming water.

The invention may be easily and inexpensively constructed with common parts by a homeowner.

These and other objects, features and advantages of the present invention will be clearly understood through consideration of the following detailed description.

BRIEF DESCRIPTION OF THE DRAWINGS

In the course of the following detailed description reference will be frequently made to the accompanying drawings in which:

FIG. 1 is a sectional view taken through a basement sump and through the valve assembly, illustrating a sump pump regulating valve constructed in accordance with the principles of the present invention shown installed in the sump pit and fully activated by rise in the water level;

FIG. 2 is the same view as FIG. 1, but illustrating the a water level in the sump pit that has not fully activated the regulating valve;

FIG. 3 is a detailed elevational view, partially in section, of the sump pit regulating valve of FIGS. 1 & 2.; and, FIG. 4 is an exploded view of all of the parts used to assemble the sump pit regulating valve of FIGS. 1–3.

DETAILED DESCRIPTION OF THE INVENTION

As mentioned above, a homeowner typically has a sump, or pit, formed in the floor of his basement. Drain tiles, which are perforated pipes that extend around the foundation of a house, collect water, known as "groundwater" and channel this groundwater into the sump pit. This collection occurs when the ground is wet and when it rains heavily, the ground may become saturated and if not for the drain tiles and sump pit, this groundwater would seep into the basement of the house through cracks in the foundation or where the foundation slab meets the foundation footings.

Homeowners use sump pumps that are inserted into the sump pits. These sump pumps have an opening through which water in the sump enters and an exit opening through which the pumped water exits. Piping is run between the sump pump and a penetration in the building wall so that the water is ejected from the sump by the sump pump. As every homeowner with a sump pump knows, so long as the sump pump is operating, it will empty groundwater entering the sump pit to a location outside of the building. Thus, sump pumps are critical in keeping a homeowner's basement dry and in the prevention of flooding of the basement.

Sump pumps are run on electricity and when the electricity fails, the sump pump can no longer pump water from the sump pit. As every homeowner knows, the water will soon rise in the sump and come out its top, thereby flooding the basement. The present invention is directed to an apparatus in the form of a sump pit regulating valve that does not rely upon electricity and is operated by the water level in the sump pit.

Turning now to FIG. 1, a typical basement sump pit 100 is illustrated. The sump pit 100 may be considered as a hollow cylinder 101 that is inserted into an opening 103 formed in the basement slab 104. Drain tiles 1, which are perforated pipes that are laid around the perimeter of the foundation extend under the basement slab and usually terminate in a sump pipe 105, as shown, that penetrates through the sump pit 100. The sump pipe 105 has an opening 106 at its end 107, through which groundwater flows.

A sump pump 14 is typically used by a homeowner to eject water that collects in the sump pit 100 during times of rainstorms and snow and other wet types of precipitation. The sump pump 14 typically has, as illustrated in FIG. 1, a pump motor 50, a water opening 51, a water exit 52 and a length of piping 53 that is connected to the water exit 52 and which runs to a point outside of the building or home (not shown).

In its simplest sense, the present invention includes a sump pit regulating valve assembly 20 that is attached to the end 107 of the sump pipe 105. The parts that make up the regulating valve assembly are illustrated in FIG. 4. They include an valve body member, shown in the form of a hollow "tee"-pipe section 2, and an end cap 12 that is adapted to fit one end 60 of the tee-pipe 2 so that it is closed off. As is known in the art and as shown in FIGS. 3 and 4, the tee-pipe section 2 has a main hollow pipe portion 150 and a branch hollow pipe portion 151. A moveable valve or plunger member 9, shown as a flapper valve member is provided and fits within the other, open end 61 of the tee-pipe 2 and is attached at one end thereof to the interior wall 62 of the tee-pipe 2 by way of a spring 13 that extends between two points 63, 64 on the wall 62 of the tee-pipe 2 and the valve member 9.

A float member 8 that serves to operate the valve assembly 20 is provided and, as shown, includes a hollow spherical element 21, although it will be understood that any hollow element may be used, and which has two connection points 22, 23 formed thereon. At these connection points 22, 23, the float member 8 is respectively connected to the tee-pipe cap member 12 by way of a pivot assembly, shown at 11, and one end of an elongated cable 10. The other end of the cable 10 is connected to the valve member 9. The cable 10, as seen in FIGS. 3 and 4, has a length that is greater than the length of the branch section 151 of the tee-pipe section 2.

In order to provide a connection between the tee-pipe 2 and the sump pipe 105, a hollow coupling 5 is provided, shown in the form of a flexible sleeve, formed from rubber or some other suitable material. Two attachment bands 4, such as cable ties or slotted bands are provided so that the assembly 20 may be secured to the sump pipe 105. The assembly 20 is installed on the sump pipe 105 in the manner shown in FIG. 2, wherein the main portion 150 is attached to the sump pipe end 107 and the branch portion 151 is oriented so that it is vertical within the sump pit 100.

The parts are assembled as shown best in FIG. 3, wherein one end 60 of the tee-pipe 2 is capped of by the cap 12 and the valve member 9 is inserted into the opposing, and open end 61 of the tee-pipe 2. The one end of the valve member 9 is secured to the tee-pipe 2 by way of the spring 13, while the cable is attached at its opposing ends to the valve member and the float member 8. The flexible coupling 5 is used to provide a coupling between the free end of the sump pipe 105 and the connection end 24 of the tee-pipe 2.

The normal operation and orientation of the assembly 20 is illustrated in FIG. 2 such as when the sump pump 14 is operating normally. The water level in the sump pit 100 is maintained at a normal level, such as that illustrated in FIG. 2 or at a lower level than that shown. In the former instance, the float member and its cable do not exert any sort of closing force on the valve member 9. The spring 13 operates to keep the valve member 9 in an open position so that water entering the sump pipe 105 from the drain tile 1, can easily flow through the tee-pipe 2 and its open end 61.

In instances where the electricity powering the sump pump goes out or where the sump pump dies of its own accord, the regulating valve assembly 20 serves to protect the homeowner by shutting closed. This is illustrated in FIG. 1 where the sump pump 14 is not operating and the water level in the sump pit 100 begins to rise. As the water rises, the float member 8 also rises. Because one end of the float member 8 is connected by way of a pivot assembly 11 to the tee-pipe, shown at the center of the cap 12 of the tee-pipe 2, and the other end of the float member 8 is connected to the valve member 9 by the cable 10, the float member as it rises will draw the cable taut and pull the valve member 9 down against the open end 61 of the tee-pipe 2. The pivot assembly 11 permits the float member 8 to rise upwardly above the end cap 12 of the one end 60 of the branch section 151 of the tee-pipe section 2. This causes the valve member 9 to completely close off the open end 61 so that water flowing through the drain tile 1 into the tee-pipe 2 is stopped at the valve member 9.

While the preferred embodiment of the invention have been shown and described, it will be apparent to those skilled in the art that changes and modifications may be made therein without departing from the spirit of the invention, the scope of which is defined by the appended claims.

I claim:

1. A fail-safe sump pit regulating valve assembly for controlling flow of groundwater entering a sump pit when a sump pump in the sump pit fails to operate in order to prevent overflow water in said sump pit, the regulating valve assembly comprising:

a valve body portion in the form of a hollow, tee-pipe section having first, second and third free end portions, a first of the three free end portions being closed with a cap member, a second of the free ends being positioned opposite to and below said first free end and a third of said three free ends being interposed between said first and second free ends, the third free end extending in a direction generally traverse to said first and second free ends, said third free end being matable to a sump pipe entering said sump pit;

said valve assembly further including a float member, and a plunger member for selectively closing said second free end shaft, the plunger member being oriented horizontally and movably mounted in an interior portion of said tee-pipe section near said tee-pipe section second free end thereof, said plunger member being movable between a first operative position wherein said second free end is open to the passage of water thereinto, and a second operative position wherein said plunger member closes off said second free end to prevent entrance of water into said second free end, said plunger member being biased into said first operative position by a spring connected to and extending between said plunger member and an interior portion of said valve body tee-pipe section proximate to said second free end thereof, said float member being moveably connected to said valve body portion first free end at one end of said float member and being tethered to said plunger member at another end of said float member, said float member being interposed between said valve body portion first free end and said valve body second free end when said plunger member is in said first operative position, such that water rising in said sump pit will raise said float member to a level above said valve body portion first free end, thereby tensioning said tether and exerting a closing force on said plunger member that exceeds the biasing force applied to said plunger member by said spring, the raising of said float member not requiring any electricity for an electrical power source to effect said raising of said float member.

2. The sump pit regulating valve assembly as defined in claim 1, further including means for coupling said valve body portion to a free end of a sump pipe entering said sump pit.

3. The sump pit regulating valve assembly as defined in claim 2, wherein said coupling means includes a flexible, hollow sleeve member having two open ends, one of said ends being dimensioned to fit onto said sump pipe free end and the other of said ends being dimensioned to fit onto said valve body third free end.

4. The sump pit regulating valve assembly as defined in claim 3, wherein said coupling means further includes at least a pair of bands that may be secured around and over said flexible, hollow sleeve member in order to secure said two open ends thereof respectively to said valve body third free end and said sump pipe free end.

5. The sump pit regulating valve assembly as defined in claim 1, wherein said valve body portion first free end is situated at a level above said valve body portion second free end.

6. The sump pit regulating valve assembly as defined in claim 1, wherein said float member is pivotally connected to said valve body portion first free end at said cap portion thereof.

7. The support regulatory valve assembly as defined in claim 6, where said float member is tethered to said plunger member by a cable having a length greater than a main section of said tee-pipe section.

8. A safety valve assembly for shutting off the flow of water from a drainage pipe into a sump pit when a sump pump disposed in the sump pit fails to operate in order to prevent the water from overflowing from the sump pit, the sump pit having an entrance pipe communicating therewith and with a free end opening into said sump pit, the valve assembly comprising:

a valve body portion, the valve body portion having at least first and second openings formed thereon that cooperatively define a passage through said valve body portion, said valve body including a hollow tee-pipe section having a main pipe portion for mating to said sump pipe and a branch pipe portion offset from said main pipe portion, the branch pipe portion being oriented vertically within respect to said main pipe portion and having two opposing ends, one of said branch pipe ends being sealed and the other of said branch pipe ends being open, said sealed branch pipe end being disposed above said open branch pipe end, the first opening being adapted for attachment to the sump pipe free end, the second opening being disposed at said branch pipe other end and spaced apart from said first opening, said second opening being further oriented in a direction that is transverse to said first opening;

a valve closure element in the form of a flapper valve, the flapper valve being movably connected to said valve body portion at said second end, said flapper valve being selectively moveable between first and second operative positions, wherein in said first operative position said flapper valve is in an open position and wherein in said second operative position, said flapper valve closes off said valve body second opening, said flapper valve being disposed completely within said valve body and hingedly connected to an interior portion of said valve body;

a spring assembly for biasing said flapper valve into said first operative position and which maintains said valve body second opening in an open condition, the spring assembly also being disposed completely within said valve body, said spring assembly being connected at one end thereof to an interior portion of said valve body and at another end thereof to said flapper valve at a location opposite to said hinged connection, said spring assembly biasing said flapper valve into an open position within said valve body; and, a float member disposed outside of said valve body portion and connected at one end thereof to said flapper valve by way of a cable of a predetermined length, the float member being movably connected at another end thereof to said branch pipe sealed end, whereby when water flowing into said sump pit reaches a predetermined level said cable is drawn taut, and said float member exerts a closing force on said flapper valve that overcomes said spring assembly bias to move said flapper valve to said second operative position, thereby closing off said valve body portion second end.

9. The valve assembly of claim 8, wherein said valve closure element is disposed within said branch pipe section proximate to said other end thereof, said valve closure element being connected by said spring assembly to an interior portion of said branch pipe section.

10. The valve assembly of claim 8, wherein said cable predetermined length is greater than a length of said branch pipe section and where said float member is connected to said branch pipe section one end at another end of said float member.

11. The valve assembly of claim 10, wherein said float member is connected to said branch pipe section one end by a pivot assembly.

12. The valve assembly of claim 8, further including a coupling member for coupling said sump pipe free end to said valve body first opening, said coupling member including a flexible sleeve.

* * * * *